United States Patent
Schrijen et al.

(10) Patent No.: US 11,183,083 B2
(45) Date of Patent: Nov. 23, 2021

(54) CRYPTOGRAPHIC DEVICE AND MEMORY BASED PUF

(71) Applicant: Intrinsic ID B.V., Eindhoven (NL)

(72) Inventors: Geert Jan Schrijen, Roermond (NL); Pim Theo Tuyls, Los Altos, CA (US)

(73) Assignee: INTRINSIC ID B.V., Eindhoven (NL)

( * ) Notice: Subject to any disclaimer, the term of this patent is extended or adjusted under 35 U.S.C. 154(b) by 316 days.

(21) Appl. No.: 16/306,459

(22) PCT Filed: May 18, 2017

(86) PCT No.: PCT/EP2017/061966
§ 371 (c)(1),
(2) Date: Nov. 30, 2018

(87) PCT Pub. No.: WO2017/207288
PCT Pub. Date: Dec. 7, 2017

(65) Prior Publication Data
US 2019/0221139 A1    Jul. 18, 2019

Related U.S. Application Data

(60) Provisional application No. 62/344,221, filed on Jun. 1, 2016.

(51) Int. Cl.
*G09C 1/00* (2006.01)
*H04L 9/08* (2006.01)
(Continued)

(52) U.S. Cl.
CPC .............. *G09C 1/00* (2013.01); *G06F 3/062* (2013.01); *G06F 3/0655* (2013.01);
(Continued)

(58) Field of Classification Search
CPC ......... G09C 1/00; G06F 3/062; G06F 3/0655; G06F 3/0679; H04L 9/0866;
(Continued)

(56) References Cited

U.S. PATENT DOCUMENTS

| | | | |
|---|---|---|---|
| 2014/0126306 A1* | 5/2014 | Otterstedt | G11C 7/06 365/189.07 |
| 2015/0055417 A1* | 2/2015 | Kim | G11C 16/10 365/185.19 |

(Continued)

FOREIGN PATENT DOCUMENTS

WO    WO2015/046682 A1    4/2015

OTHER PUBLICATIONS

Cortez, M., et al., "Intelligent Voltage Ramp-Up Time Adaptation for Temperature Noise Reduction on Memory-Based PUF Systems," IEEE Transactions on Computer and Aided Design of Integrated Circuits and Systems, IEEE Service Center, Piscataway, NJ, US, vol. 34, No. 7, Jul. 1, 2015, pp. 1162-1175.

(Continued)

*Primary Examiner* — Hee K Song
(74) *Attorney, Agent, or Firm* — Kenealy Vaidya LLP (57) ABSTRACT

Some embodiments are directed to a cryptographic device, including
 a non-volatile memory, a range of the memory storing data,
 a selector arranged to receive a selector signal configuring a memory read-out unit for a regular read-out mode or for a PUF read-out mode of the same memory,
 a control unit arranged to
  send the selector signal to the selector configuring the memory read-out unit in the regular read-out mode, and reading the memory range to obtain the data, and
  send the selector signal to the selector configuring the memory read-out unit for PUF read-out mode and obtaining a noisy bit string from the memory range.

17 Claims, 5 Drawing Sheets

(51) Int. Cl.
*G06F 3/06* (2006.01)
*H04L 9/32* (2006.01)
(52) U.S. Cl.
CPC .......... *G06F 3/0679* (2013.01); *H04L 9/0866* (2013.01); *H04L 9/3278* (2013.01); *H04L 9/32* (2013.01); *H04L 2209/08* (2013.01); *H04L 2209/12* (2013.01)
(58) Field of Classification Search
CPC ..... H04L 9/3278; H04L 9/32; H04L 2209/08; H04L 2209/12
See application file for complete search history.

(56) References Cited

U.S. PATENT DOCUMENTS

2015/0070979 A1   3/2015   Zhu et al.
2015/0071432 A1   3/2015   Zhu et al.

OTHER PUBLICATIONS

Zhang, L., et al., "Optimizing Emerging Nonvolatile Memories for Dual-Mode Applications: Data Storage and Key Generator," IEEE Transactions On Computer and Aided Design of Integrated Circuits and Systems, IEEE Service Center, Piscataway, NJ, US, vol. 34, No. 7, Jul. 1, 2015, pp. 1176-1187.
Gao, Y., et al., "Emerging Physical Unclonable Functions with Nanotechnology," IEEE Access, Feb. 28, 2016, vol. 4, pp. 61-80.
International Search Report and Written Opinion for PCT Patent App. No. PCT/EP2017/061966 (dated Aug. 8, 2017).

* cited by examiner

CRYPTOGRAPHIC DEVICE AND MEMORY BASED PUF

CROSS REFERENCE TO RELATED APPLICATION(S)

This application is a National Phase Filing under 35 C.F.R. § 371 of and claims priority to PCT Patent Application No. PCT/EP2017/061966, filed on May 18, 2017, which claims the priority benefit under 35 U.S.C. § 119 of U.S. Provisional Application No. 62/344,221, filed on Jun. 1, 2016, the contents of each of which are hereby incorporated in their entireties by reference.

BACKGROUND

Some embodiments relate to a cryptographic device, a method of obtaining a noisy string, a computer program, and a computer readable medium.

In modern devices, there is an increasing need to protect communication from attacks. For example, digital communication may be protected by encrypting it or authenticating it, e.g., using a cryptographic key. Likewise, there is a need to protect data stored on devices. For example, users store financial and personal information on their mobile devices. When such a mobile device is lost, it is desirable that an attacker cannot easily access or modify that information. Also, in this situation the problem may be alleviated by encrypting and/or authentication the data with a cryptographic algorithm such as an encryption or authentication algorithm. Again, a cryptographic key may be required to perform these tasks.

A consequence of protecting data using cryptographic algorithms, rather than, say, making access itself harder, is that the security problem is increasingly concentrated in the cryptographic key.

There is thus a strong desire to secure cryptographic keys in devices. One approach is to derive secret key from a Physical Unclonable function (PUF) included in the device. An overview of PUFs is given, e.g. in European patent application EP15195585.3, included herein by reference; see, e.g., the section 'Physical Unclonable functions', starting page 7.

PUFs are bound to a physical device in such a way that it is computationally infeasible to predict the output of the function without actually evaluating the PUF using the physical device. Furthermore, as the PUF is realized by a physical system it is hard to clone. A PUF and by implication the device that includes the PUF may be uniquely identified based on its response.

The PUF's physical system is designed such that it interacts in a complicated way with stimuli and leads to unique but unpredictable responses. The stimuli of a PUF are referred to as the challenges. Although, some PUFs allow a larger range of different challenges, producing different responses, many PUFs have only a single challenge (single challenge PUFs).

In the practice often memory based PUFs are used in which the response pattern depends on physical characteristics of the memory elements. For example, a class of PUFs is formed by an electronic volatile memory that contains, upon power-up, a response pattern of power-up values useful for identification of the memory.

One related art example of a PUF used to uniquely identify a device is the so-called SRAM PUF, which is based on the fact that, when an SRAM cell is started-up it starts up in a random state due to variations in the threshold voltages of the transistors, which, in turn, are due to doping variations. When this is done multiple times, each cell will start up in the same state most of the time. These PUFs may be realized on any device having SRAM memory on board.

SUMMARY

A disadvantage of memory based PUFs, and in particular of PUFs based on volatile memory such a SRAM, is that a relatively large part of memory must be dedicated for use as a PUF. As PUF responses are generally noisy, relatively large amount of PUF data is needed to obtain a reproducible string, that may be used, e.g., to derive key, or for use as a non-noisy identifier. It is relatively costly to have to dedicate a large amount of memory for the PUF. It would desirable to obtain memory based PUF data which needs less memory.

Some embodiments disclose a cryptographic device is provided including a non-volatile memory, the non-volatile memory including multiple memory cells that are programmed or not-programmed, a range of the memory storing data, a memory read-out unit including a selector arranged to receive a selector signal configuring the memory read-out unit for a regular read-out mode or for a PUF read-out mode of the same memory, in the regular read-out mode, the memory read-out unit being arranged to apply a first voltage to selected memory cells to determine if the cells are programmed or not-programmed, and in the PUF read-out mode, the memory read-out unit being arranged to apply a second voltage to selected programmed memory cells to obtain a noisy bit string from the memory, and a control unit or controller arranged to send the selector signal to the selector configuring the memory read-out unit in the regular read-out mode, and reading the memory range to obtain the data, and send the selector signal to the selector configuring the memory read-out unit for PUF read-out mode, and obtaining a noisy bit string from the memory range.

In the device a range of a memory is used for two purposes: to store data and to generate PUF data. Thus, no additional PUF is needed in addition to the non-volatile memory, such as SRAM based PUF or the like, thus significantly reducing the footprint, and thus cost of using PUF technology. In an embodiment, the bit string read in the PUF read-out mode is device unique; for example, the bit string is sufficiently different from all other bit string of a same set of device, e.g., devices of the same design. In fact the bit string may be globally unique, e.g., if the bit string is long enough. To be sufficiently different, for example, a hamming distance between the two bit strings may be above a threshold. A suitable threshold depends, e.g., on the number of devices, the error rate, etc.

In an embodiment, the device includes a validation unit arranged to correct the noisy bit string using helper data. Removing noise from the noisy bit string makes it suitable for cryptographic purposes such as derivation of a key. In an embodiment, the validation unit is also arranged to verify an authentication token using a verification key, said authentication token having previously been computed over the helper data and/or a second voltage indicator indicating the second voltage applied by the memory read-out unit. Verifying an authentication token makes it harder to abuse the helper data and/or the second voltage indicator to attack the PUF data, e.g., the noisy bit string. In an embodiment, the device is arranged to erase and re-program a programmed memory cell to reconfigure the PUF data (this may also be referred to as resetting a PUF).

The device is an electronic device, e.g., a mobile electronic device, such as a mobile phone. The device may be a set-top box, smart card, computer, etc.

A method of obtaining a noisy string described herein may be applied in a wide range of practical applications. Such practical applications include: financial applications, e.g., requiring the authentication of financial transactions, secure data storage, secure communication, identification, access control, content distribution, digital right management, data authentication, device authentication, etc. For example, devices such as sensors, wearable devices, mobile devices, e.g., mobile phones, etc, may be authenticated using a PUF as defined herein.

A method according to some embodiments may be implemented on a computer as a computer implemented method, or in dedicated hardware, or in a combination of both. Executable code for a method according to the disclosed embodiments may be stored on a computer program product. Examples of computer program products include memory devices, optical storage devices, integrated circuits, servers, online software, etc. The computer program product includes non-transitory program code stored on a computer readable medium for performing a method according to the disclosed embodiments when said program product is executed on a computer.

In a one embodiment, the computer program includes computer program code adapted to perform all the steps of a method according to the disclosed embodiments when the computer program is run on a computer. The computer program can be embodied on a computer readable medium.

Another aspect of some embodiments provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE FIGURES

Further details, aspects of the disclosed embodiments will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a cryptographic device, FIG. 1b schematically shows an example of an embodiment of multiple memory cells, FIG. 2 schematically shows an example of reading multiple memory cells in regular read-out mode and PUF read-out mode, FIG. 3 schematically shows an example of an embodiment of a cryptographic device, FIG. 4a schematically shows an example of an embodiment of multiple memory cells, FIG. 4b schematically shows an example of an embodiment of multiple memory cells, FIG. 5 schematically shows an example of an embodiment of a cryptographic method, FIG. 6a schematically shows a computer readable medium having a writable part including a computer program according to an embodiment, FIG. 6b schematically shows a representation of a processor system according to an embodiment.

LIST OF REFERENCE NUMERALS, FIGS. 1, 3, AND 4

100 a cryptographic device
110 a non-volatile memory
120 a memory read-out unit
125 a selector
121 a selector signal
122 a data signal
130 a control unit
140 a non-volatile helper data memory
142 a validation unit
144 an authentication unit
150 a voltage unit
210, 310, 350 multiple memory cells
220 a range
322 a first range
324 a second range
362 a first range
364 a second range
366 a third range

DETAILED DESCRIPTION OF EXEMPLARY EMBODIMENTS

While the disclosure is susceptible of embodiments in many different forms, there are shown in the drawings and will herein be described in detail one or more particular embodiments, with the understanding that the present disclosure is to be considered as exemplary of the principles of the disclosure and not intended to limit the disclosure to the particular embodiments shown and described.

In the following, for the sake of understanding, elements of embodiments are described in operation. However, it will be apparent that the respective elements are arranged to perform the functions being described as performed by them.

Figure 1A:
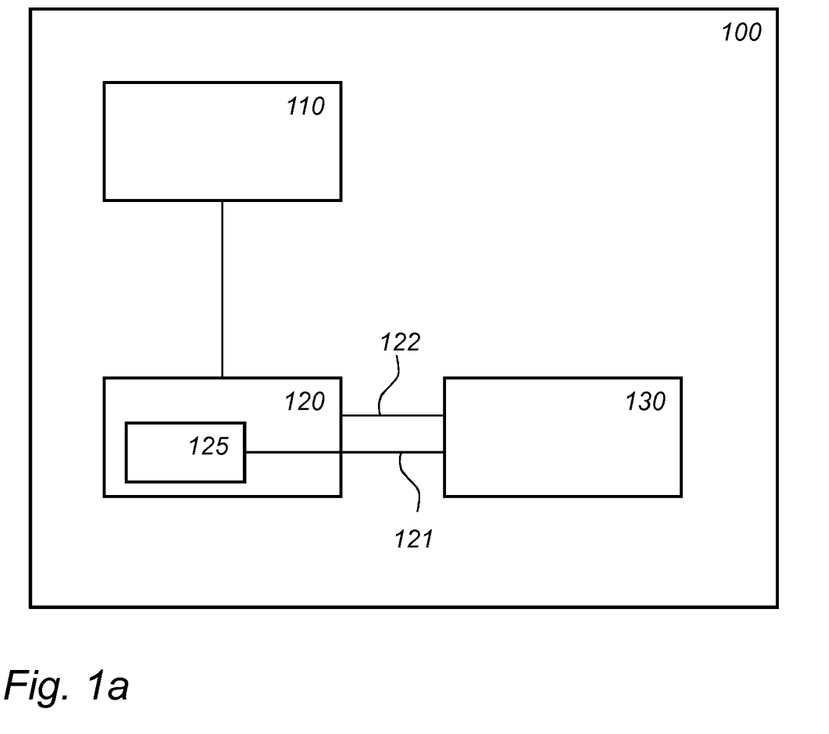
Figure 1B:
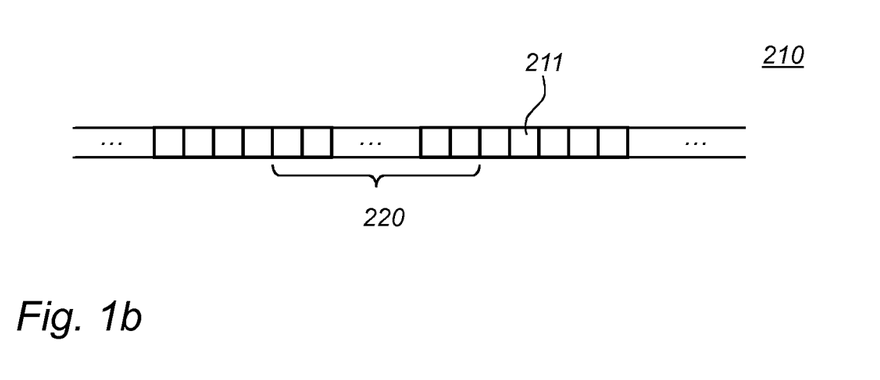

FIG. 1a schematically shows an example of an embodiment of a cryptographic device 100. Device 100 includes a non-volatile memory 110. Memory 110 includes multiple memory cells. FIG. 1b schematically shows an example of an embodiment of multiple memory cells 210, as may be used in non-volatile memory 110. One of the memory cells in FIG. 1b has been identified with reference numeral 211. A memory cell can be programmed or not-programmed. The pattern of programmed and not-programmed cells determines the data stored in the memory. The memory is used to store data, which may be used for any purpose, e.g., to render or execute it, etc. The memory cells are typically arranged to hold a single bit. Embodiments may use multi valued memory cells, in which case, there may be multiple types of programmed cells; Below we will assume for simplicity that the memory cells are binary memory cells.

A range 220 of the memory stores the data. A range may be represented as a set of memory addresses, e.g., an address range. Individual bits may not be directly addressable, but may nevertheless be written or retrieved by writing or retrieving a larger memory object, say, a byte, a word, etc, in which the bit is comprised.

For example, range 220 may be 1024 bits or more, 2048 bits or more, etc. For example, a 2048 bit range may be represented as 256 byte addresses, e.g., a 256 byte address range. Should the memory be addressable as 16 bit or 32 bit words, then a 128 or 64 word address range may be used, respectively. For example, a range may be a set of consecutive memory addresses.

The memory is a non-volatile memory. The memory may be writable, but this is not needed, and may instead be read only.

In an embodiment, the memory is a flash memory; the multiple memory cells being flash memory cells. Other memory types are also possible as further expanded upon below.

A flash memory cell includes a floating gate. By negatively charging the floating gate, e.g., placing electrons on it, the cell is programmed. Applying a first voltage to a not-programmed memory cell causes a current detectable by the read-out unit. However, if the floating gate is charged the channel is partially blocked, and the threshold voltage of the cell increases. This means that now a higher voltage would have to be applied to make the cell conductive. The first voltage is chosen to be lower than this higher voltage, so that applying the first voltage to a not-programmed memory cell does not cause the current detectable by the read-out unit.

We will use the convention that a programmed memory cell, e.g., with a charged floating gate, is called a '0' bit, as there is a higher threshold voltage, while a not-programmed memory cell, i.e., a not-charged floating gate, is called a '1' as there is a lower threshold voltage. Note, that the assignment of the 1 and 0 states may be reversed if desired.

The threshold voltage of a memory cell is not exactly the same for all memory cells. Small fluctuations caused by slight variations during manufacturing and/or slight variations in the charge of the floating gate cause the threshold voltage of both programmed and not-programmed to cells to vary somewhat. This variation can be exploited to obtain a PUF from a non-volatile memory. In the art memory based PUFs are known that use volatile memory such as SRAM.

Device 100 includes a memory read-out unit 120. Memory read-out unit 120 is arranged to read memory 110. For example, memory read-out unit 120 may include an addressing mechanism for addressing individual bits of memory 110. For example, the addressing mechanism may include multiple word lines and multiple bit lines. In an embodiment, each one of the multiple memory cells is connected to one of the word lines and one of the bit lines. Memory read-out unit 120 may have an interface for receiving write requests, read requests, and/or erase requests. Memory read-out unit 120 may provide the results of such requests on an output. Both requests and results, e.g., retrieved data, may be delivered to and form memory read-out unit 120 through some kind of interconnect, say a bus.

In an embodiment, memory read-out unit 120 is arranged to apply a voltage to (the gate of) a selected memory cell, e.g., selected through the addressing mechanism. If the applied voltage is above a threshold voltage of the selected memory cell, then the memory cell will produce a current that is picked up by sense amps. If the applied voltage is below the threshold voltage of the selected memory cell, then the memory cell will not cause a current. Memory read-out unit 120 is arranged to detect the presence or absence of that current. In other words, memory read-out unit 120 obtains information on the threshold voltage of memory cells by comparing currents related to the applied gate voltages.

Memory read-out unit 120 includes a selector 125. Selector 125 is arranged to receive a selector signal 121 configuring the memory read-out unit for a regular read-out mode or for a PUF read-out mode of the same memory.

In the regular read-out mode, the memory read-out unit is arranged to apply a first voltage to selected memory cells to determine if the cells are programmed or not-programmed.

The first voltage is chosen between the threshold voltage of a programmed cell and a not-programmed cell. If the memory cell is programmed, the floating gate is charged and the threshold voltage is increased. When applying the first voltage, the memory cell does not cause a current that is detectable by memory read-out unit 120. If the memory cell is not-programmed, the floating gate is not charged and the threshold voltage is not increased. When applying the first voltage the memory cell causes a current that is detectable by memory read-out unit 120. The first voltage is also referred to in the art as a read reference voltage. The first voltage may be chosen as the median of the threshold voltage of a sample of programmed and not-programmed memory cells.

Thus if the memory read-out unit 120 is arranged in regular read-out mode, the memory can be read out as a conventional memory. Any data that was previously stored in the memory can thus be retrieved and used for any purpose for which it is needed.

Selector 120 can also be arranged in PUF read-out mode. In PUF read-out mode, memory read-out unit 120 is arranged to apply a second voltage to (gates of the) selected programmed memory cells to obtain a noisy bit string from the memory. The second voltage may also be referred to as the PUF reference voltage.

There are two options for the second voltage. It may be higher or lower than the first voltage, i.e., the read reference voltage.

By choosing the second voltage lower than the first voltage, some not-programmed cells which have a relatively high threshold voltage will now cease to cause a detectable current. That is, they may be read as a logical 0. Programmed cells already have a high threshold voltage, so the programmed cells still do not cause a detectable current and will be read as programmed. In other words the second voltage is chosen to be lower than the first voltage, so that all programmed and at least some not-programmed cells do not cause a detectable current if the second voltage is applied to them; The remainder of the not-programmed cells cause a detectable current if the second voltage is applied to them. The second voltage may be chosen as the median of the threshold voltage of the not-programmed cells.

By choosing the second voltage higher than the first voltage, some programmed cells which have a relatively low threshold voltage will now cause a detectable current. That is, they may be read as a logical 1. Not-programmed cell already have a low threshold voltage, so the not-programmed cells will still cause a detectable current and be read as not-programmed. In other words the second voltage is chosen to be higher than the first voltage, so that all not-programmed and at least some programmed cells cause a detectable current if the second voltage is applied to them; The remainder of the programmed cells do not cause a detectable current if the second voltage is applied to them. The second voltage may be chosen as the median of the threshold voltage of the programmed cells.

Choosing the second voltage higher than the first voltage has the benefit that the PUF can be reprogrammed. Ordinarily, a PUF has a fixed, though noisy, value. If the second voltage is higher than the first voltage, the threshold voltage depends on the amount of charge on the floating gate in programmed cells. By erasing and re-programming the programmed cells, the data stored in the cells remains the same, yet the PUF value changes.

Below we will assume that the second voltage is higher, so that in PUF read-out mode 1-bits, i.e., not-programmed memory cells will continue to be read as 1-bits, whereas some of the 0-bits, i.e., programmed memory cells, will be read 1-bits and some as 0-bits. Note that, in an embodiment the second voltage may also be chosen as lower, and/or that the assignment of the labels 1-bit and 0-bits to not-programmed and programmed states is arbitrary.

In both cases, the bit string read from the memory will be noisy. A memory cell is arranged so that the threshold voltages for programmed and not-programmed cells are clearly separated, and thus the cell is very likely to reproduce the same data as was stored in it. However, in PUF read out mode, the threshold voltage of some cells may be close to the second voltage, as a result of which those cells may sometimes be read as programmed or not-programmed. The result is that the string read in PUF mode may be noisier. For some applications, this is not a problem. If the noise is a problem, helper data may be used as described below.

In an embodiment, selector 125 includes a settings register. The settings register is arranged to receive data indicative of settings of the selector 125. For example, the settings register may receive an indication of regular/PUF mode which does not contain the voltage used, e.g., a 1-bit setting to select regular or PUF mode. In the latter case, the selector may obtain the first and second voltage to use from an internal storage.

In an embodiment, selector 125 is arranged to receive a second voltage indicator indicating the second voltage. For example, the settings register may receive a digital representation of the read reference voltage. By writing the first voltage to the settings register, regular read mode is obtained. By writing the second voltage to the settings register, PUF read mode is obtained.

In an embodiment, device 100, e.g., read-out unit 120 may include a non-volatile memory arranged to store the second voltage indicator. In an embodiment, device 100 may be arranged to receive the second voltage indicator from external of the cryptographic device. The latter has the advantage that access to the PUF mode can be triggered from outside of the device. For example, during an enrollment phase, say during manufacture, testing, first boot, etc, the second voltage is determined, and the noisy bit string is read out. At this point the second voltage is stored on an external computer but not stored on device 100. Later, when needed, the second voltage is provided to device 100, possibly together with helper data. Selector 125 is now able to configure the memory read-out as PUF read out using the received second voltage. The read noisy bit string may be then be used, say, to obtain a key. For example, the key may be used to recover from an attack. See, e.g., WO2011048126 (included herein by reference) for a way of using helper data to obtain a decryption key after a security breach; in an embodiment the helper data may also include a second voltage, and possibly a range.

Device 100 further includes a control unit 130. Control unit 130 is arranged to use selector 125 to alternatively obtain data stored in some range of memory 110, or a noisy bit string obtained from the same range.

In particular, control unit 130 may be arranged to send selector signal 121 to selector 125 configuring the memory read-out unit in the regular read-out mode, and reading the memory range to obtain the data, e.g., data signal 122. In the same embodiment, control unit 130 may also be arranged to send selector signal 121 to selector 125 configuring the memory read-out unit for PUF read-out mode, and obtaining a noisy bit string from the memory range, e.g. also using data signal 122. Thus control unit 130 is arranged to read the same range at least twice: at least once in regular read-out mode and at least once in PUF read out mode. There is no particular order in which control unit 130 needs to read memory 110; for example, control 130 may first read in regular read-out mode and later in PUF read out mode, or vice versa. In between, control 130 may perform other reads or perform data processing, etc. In an embodiment, PUF read-out uses the same hardware as regular read out, except with a different reference voltage.

FIG. 1b shows the multiple memory cells 210 and a range 220 therein. After control unit 130 read range 220 in regular read-out, control unit 130 may continue to use the data for some purpose.

For example, the data regularly read from the range may include computer code, e.g., processor instructions, and control unit 130 may be arranged to execute the computer code. For example, range 220 may include firmware or application software etc. The computer code stored in range 220 may, but does not need to be, related to processing the noisy bit string. For example, the computer code may be unrelated, e.g., computer code for allowing boot-up, word processing, etc. The computer code may be arranged to perform error correction using helper data of the noisy bit string, key derivation, and/or processing of the noisy bit string, etc; The benefit of the latter is that a compact software object is obtained that uses only little additional memory beyond the memory needed to store the computer code.

For example, the data may include data that may be processed using an algorithm, e.g., rendered. For example, the data may include image data and control unit 130 may be arranged to display the image on a display. For example, the data may include text data, and control unit 130 may be arranged to display or send the text data.

The data stored in range 220 is read-only data. Although the non-volatile memory may be arranged for both reading and writing, e.g., Flash memory, writing data to range 220 would very likely disturb the PUF data obtainable in PUF read-out mode. Accordingly, if data written in range 220 this is done before using range 220 as a source of PUF data. For example, data may be written to range 220, before an enrollment phase. Data such as image data or code data is convenient as it is unlikely to change after writing.

After control unit 130 reads range 220 in PUF read-out, control unit 130 may further use the data for some cryptographic purpose. For example, control unit 130 may use the noisy bit string directly as a device identifier. The device identifier is a PUF identifier, in that the value of the identifier is obtained directly from the hardware. Tampering with the hardware will likely change the device identifier. For example, the device identifier may be communicated to an external computer for identifying the device. Note that it need not be a problem if the device identifier is noisy, so-long the device identifier of other devices is sufficiently far removed, e.g., in Hamming distance. The latter depends on the average percentage of 1-bits in the noisy bit strings, the number of other device, and the entropy in the noisy bit strings. Device 100 may be identified from a list of device identifiers by selecting the closest, e.g., the closest in hamming distance. Should the device identifier not be unique enough, then this may be improved by making the string longer, e.g., making range 220 larger.

Control unit 130 may also determine a cryptographic key from at least part of the noisy bit string read from the memory range in PUF read-out mode. In the latter case, it is beneficial to use a noise reduction step, e.g., using helper data as described below. Also if the noisy bit string is to be used as a device identifier, is the use of helper data possible.

In an embodiment, the same data may be used for regular applications and as a source of PUF data. In the art, the amount of PUF data was restricted by the amount of suitable memory that was made available for PUF purposes. For example, if SRAM start-up noise is used as a source of PUF data, only so much PUF data is available as there is SRAM memory. In some applications, the amount of SRAM memory is very restricted. Moreover, other applications cannot use the same SRAM memory at the same time as it is used for a PUF purpose. In an embodiment, regular memory that is used for a different purpose is used as a source of PUF data. The other purpose of the memory may be completely unrelated. As a result the amount of PUF data is increased, without any increase in the cost. For example, in many applications, hardware is used which has a Flash memory containing software. Without adding any further memory cells, PUF applications may be used on that hardware. Moreover, as more PUF data is available, lower-rate error correcting codes may used in the helper data. Such codes, may require larger code blocks to achieve some particular error correcting capability, but often have more efficient decoding algorithms. For example, a low rate code may be obtained as a repetition code, or as a code obtained by concatenating a repetition code with some other code, etc. For example, a repetition code may be used as the inner code, and, e.g., a Hadamard code as outer code. Repetition codes may be decoded with high efficiency but may require long code words; it is therefore an advantage if a large source of low-costs PUF data is available.

In an embodiment, the memory cells may be Flash memory cells (e.g., NAND or NOR) or EEPROM memory cells, and/or PCM memory cells. For example, EEPROM cells are also programmed by putting charge on a floating gate just as in the case of Flash. PCM (Phase Change Memories) change a cell between an amorphous state and a crystallization state. The threshold voltage differs between the amorphous state and a crystallization state. Also in this case, by changing a first voltage to a second voltage, a PCM can be switched from regular read out to a PUF read out.

Finally, the memory cells may be ROM memory cells. In a ROM memory cell, the intersection of word and bit lines may or may not include a diode.

For Rom, a memory cell with a diode may be called programmed. The first voltage is chosen above the threshold voltage of the diode. When applying the first voltage there is conductance causing detectable current, resulting in a logical 1. A memory cell without a diode is not-programmed. When applying the first voltage to a not-programmed cell there is no conductance, resulting in a logical 0.

For regular read out the first voltage is selected above threshold voltage of all diodes. For PUF read out the second voltage is chosen lower than the first voltage. As a result, some of the ROM memory cells will be conducting: some of the 1 cells will be read as 0, some will be read as 1. However, all of the not-programmed memory cells will continue to be read as logical 0. In an embodiment, memory 110 includes a ROM memory and the selector is arranged for setting a reference voltage of the ROM.

Note that a ROM is a non-volatile memory that is not writable. In some applications, a lot of ROM is available, e.g., containing code or data. By making this ROM available as a PUF a large amount of PUF data is available. Previously, it was thought not to be possible to use a ROM memory as a source of PUF data.

Figure 2:
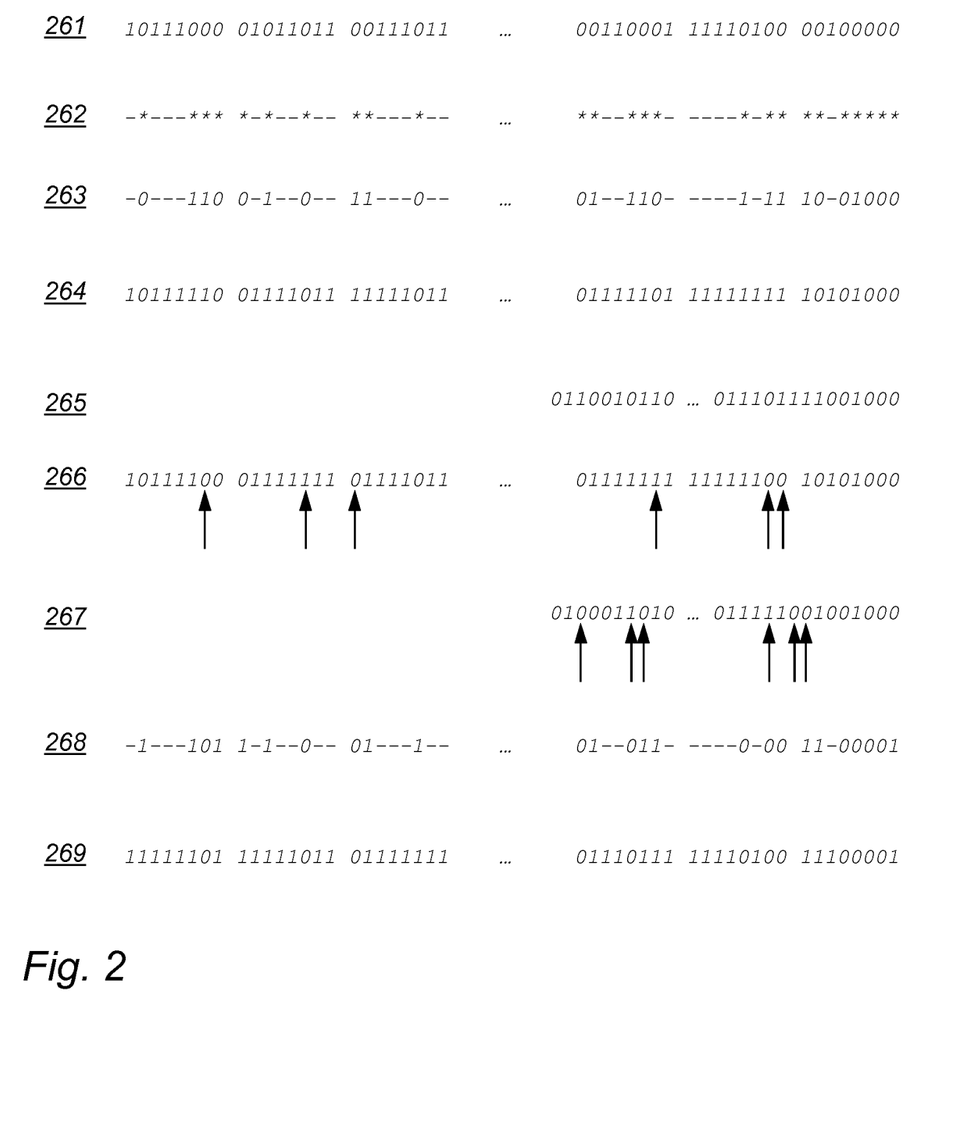

FIG. 2 schematically shows an example of reading multiple memory cells in regular read-out mode and PUF read-out mode. In this example, it is assumed that a memory cells in a logical 1 state will remain a logical 1 also in PUF read-out, whereas a memory cell in a logical 0 state may be read as a 0 or as a 1. For example, this may be achieved using an embodiment, as shown above, e.g., flash memory with a second voltage larger than the first voltage. Note however, that the example, may be adapted to different embodiments, e.g., by reversing all 0's and 1's.

Show at 261 is the result of a regular read-out of range 220. For example, control unit 130 configures selector 125 for regular read-out by sending the corresponding signal 121. The result of reading out range 220 is a pattern of 0 and 1 bits corresponding to programmed and not-programmed cells. The particular order of 0 and 1 bits may be determined by some other application. For example, the bits shown at 261 may represent (part of) an image, computer code etc.

When reading the same data as a PUF read out, all of the 1 bits will remain a 1. These cells are not as suitable for identification or as a cryptographic key, since their value and position depend on the data that happens to be in range 220. There is generally no guarantee that such data is suitable for identification, let alone that it is secret and secure. In a sense, the regular content of range 220, e.g. bit string 261, may be regarded as a template. This has been illustrated at 262, in which 1 bits are replaced by hyphens ('-') since they may be ignored, and 0 bits are replaced by stars ("*") since these are the locations at which PUF data may be obtained. We may term the latter as 'PUF cells'.

Shown at 264 is the range 220 read out in PUF-read out. For example, control unit 130 configures selector 125 for PUF read-out by sending the corresponding signal. In this example, the cells are included that store a 1 bit in regular read-out. Note that these cells are still read out as a 1. The data at 264 may be directly used, both for identification and for computing a cryptographic key. However, it must be borne in mind that about half the bits in string 264 do not contribute entropy. Furthermore, the non-PUF cells do not require error correction. Although it will work correctly if the bits from non-PUF cells are subjected to error correction, it will be more efficient if the PUF cells are error corrected.

Shown at 263 is the result of a PUF read out of range 220, in which the 1 bits have been replaced by hyphens, as indicated by template 262. The data shown in 263 is PUF data. The PUF data is determined by the physical characteristics of the cells from which they were obtained. Note that the PUF data is random. Although there may be some bias, e.g., 1 or 0 bits may be overrepresented, the data is random in the sense that they cannot be predicted without first reading the data.

At 265 PUF data is formed by concatenating the cells shown in 263, i.e., only of the PUF cells, this is a form of processing the noisy bit string. The processed bit string 265 is still noisy.

After memory 110 has been read out in PUF read out mode, selector 125 may be switched back to regular mode and the regular data 261 may be read again. If later the PUF data is needed again, e.g., to identity device 100, or to calculate a key again, selector 125 may be set to PUF read out again and the noisy bit string may be obtained again. The latter may even be done after device 100 as been through a power cycle, e.g., switched off and on.

At 266 the result of reading range 220 again is shown. Note that the result is nearly the same, but that for some PUF cells, a different bit is read out. After concatenating the PUF cells, PUF data at 267 is obtained. The differences with the previous strings 264 and 265 are indicated with arrows. Processing string 266 or 267 using helper data can resolve these differences.

In an embodiment, e.g., in the example of FIG. 2, not-programmed cells produce the same result in regular as in PUF read-out mode, but programmed cells produce PUF data. As noted above, it may be the other way round, wherein programmed cells produce the same result in regular as in PUF read-out mode, but not-programmed cells produce PUF data. The control unit 130 may be arranged to

- send the selector signal to the selector configuring the memory read-out unit in the regular read-out mode, reading the memory range to obtain regular data, and storing the PUF data producing cells in a working memory,
- send the selector signal to the selector configuring the memory read-out unit for PUF read-out mode, and obtaining a first noisy bit string from the memory range,
- selecting from the first noisy bit string the PUF data produced by the PUF data producing cells as indicated in the working memory, and forming a second noisy bit string from the selected PUF data.

Storing the PUF data producing cells in a working memory, may be done by storing the regular read-out content of the range. In this case, programmed and not-programmed cells may be recognized from their content. Storing the PUF data producing cells in a working memory, may instead be done by storing the addresses of the PUF data producing cells in the range. For example, in the example, shown in FIG. 2, instead of storing string 261 directly, control unit 130 may also store the sequence: 2, 6, 7, 8, 9, 11, 14, . . . , to indicate the position of the 0 bits in string 261, etc.

Figure 3:
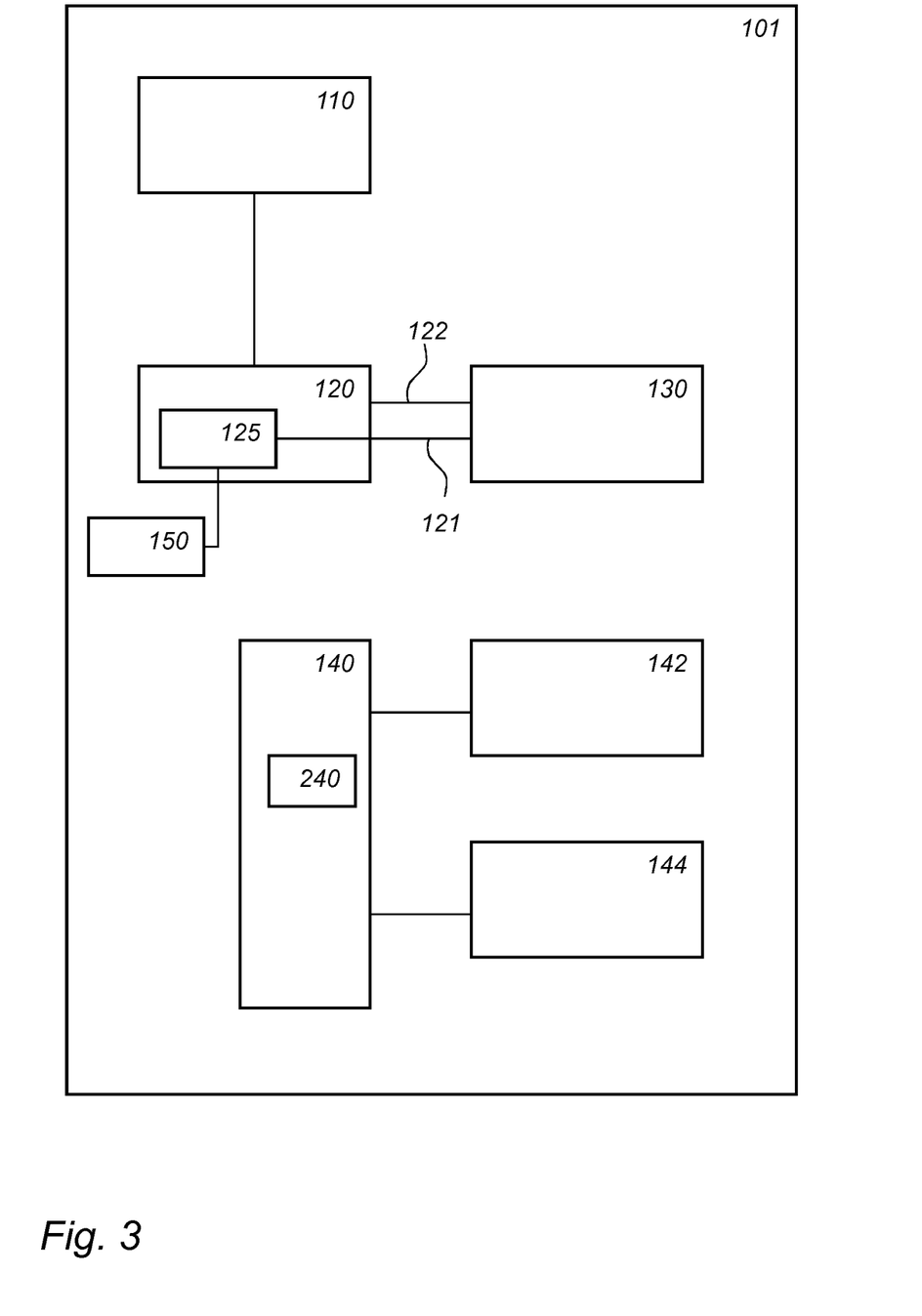

FIG. 3 schematically shows an example of an embodiment of a cryptographic device 101. Device 101 is a further development of device 100 and contains a number of additional optional features.

Device 101 includes a non-volatile helper data memory 140 arranged to store helper data 240 including redundancy information for the noisy bit string, and a validation unit 142 arranged to correct the noisy bit string using helper data 240 in helper data memory 140. In an embodiment, device 101 also includes an authentication unit 144 arranged to compute helper data 240 over at least part of the noisy bit string and to store helper data 240 in the helper data memory of the memory device. An authentication unit is not necessary as helper data 240 may have been computed by an external computer during an enrollment phase. Authentication unit 144 may be removed from device 101, after its use during an enrollment phase, e.g., be deleting its code.

Device 101 may be arranged for an enrollment phase and a later use phase. A use phase is also referred to as an operational phase. In an embodiment, there is one enrollment phase, followed by multiple operational phases; this is not needed however, for example, in an embodiment, the PUF can be reconfigured, followed by an additional enrollment phase.

In an embodiment, the electronic cryptographic device is arranged to determine a cryptographic key during the use phase. In the enrollment phase, e.g., device 101 obtains a first noisy bit string by reading the range, e.g., range 220, in PUF read-out mode, and possibly processing the resulting bit string by discarding non-PUF data. Also during the enrollment phase, authentication unit 144 computes helper data. Helper data 240 includes redundancy information for the noisy bit string that allows later errors to be corrected. Later during a use phase, the noisy bit string is obtained for a second time, e.g., by reading the same range in PUF read mode again. If processing was done, the same processing is done again. Validation unit 142 uses helper data 240 to obtain a reproducible string. The reproducible string may be the same as the first noisy bit string, bit this is not needed.

One way to compute helper data during the enrollment phase is to select one or more code words S from an error correcting code. S is at least as long as the first noisy bit string X. The helper data includes the difference W=S−X. When the noisy bit string has been obtained again as Y in the use phase, the sum of the helper data and the noisy bit string is computed: S'=W+Y. The string S' is close to one or more code words of the error correcting code and can thus be corrected back to S. One may take S as the basis for further work, e.g., to identify or to compute a key from. One may also compute X, e.g., as S−W. The minus and plus operations may be arithmetical operations, or XOR operations, or modulo operations etc. The one or more error correcting code words can be selected randomly. Other ways exist to compute helper data, e.g., by computing parity data. During the enrollment data, also other data may be computed, e.g., debiasing data. To compute a cryptographic key from S or X, one may apply a key derivation function, e.g., a hash, a KDF, etc, e.g., as in RFC 5869. Cryptographically the string S and X are equivalent, as either one can be computed from the other using the helper data W.

In an attack model for device 101, there may be the assumption that an attacker may have some partial ability to affect memory cells 210, the second voltage and/or helper data 240, even though he does not have full access to memory cells 210 or at least that gaining such full access is more costly than the value of the information protected by the noisy bit string. The latter is a safe assumption for many applications. There is a concern that such a partial ability may be elevated to an attack on the noisy bit string if the attacker is able to increase the average error level. For example, an attacker may try to change the second voltage, from its intended value, to a slightly wrong second voltage. As a result the noisy bit string will come out with errors. If the change is small, helper data 240 will be able to correct this problem. The attacker tries to fine tune the changed second voltage until helper data 240 is just barely able to correct errors, but not any further error. If the attacker uses his assumed partial ability to modify memory cells 210 he may learn the contents of said cell by observing if the modification introduces an additional error or not, i.e., if the modification causes the helper data to have insufficient redundancy to correct the additional error. For example, an attacker may observe this because the device gives an error message, fails to complete some action, etc. A similar attack increases the error level by adding noise to the helper data.

Below, various measures are described to make these types of attacks harder to perform successfully.

In an embodiment, the control unit is arranged to derive a verification key, from at least part of the corrected noisy bit string. For example, one may apply a key derivation function to S or X. The verification key may be a different key than the key which control unit 130 derives for operational use. The latter may be termed the operational key. It is possible to have the operational key the same as the verification key, but arranging control unit 130 such that the derivations of the verification and operational key are different is beneficial. This has the benefit that security problems in the verification code are less likely to impact security of the operational key.

In an embodiment, helper data memory 140 is arranged to store an authentication token previously computed over the helper data and/or a second voltage indicator indicating the second voltage applied by the memory read-out unit using the verification key.

Validation unit 142 is arranged to verify the authentication token using the verification key. For example, the validation unit 142 may be arranged to compute the same token over the same data, or at least what should be the same data, e.g., helper data 240 and/or a second voltage indicator obtained from the second voltage actually used to read memory cells 210. If an attacker modified the second voltage, and/or the helper data to increase the error level, the authentication token stored in helper data memory 140 is likely different from the token computed by validation unit 142. If validation unit 142 detects this, it may take appropriate action, e.g., generate a signal indicating a possible attack, generate an error message, delete the operation key, etc.

An authentication token may be a message authentication code, e.g., HMAC using SHA-2, CBC-MAC, etc, computed over data, e.g., the helper data, and using as key the verification key. An authentication token may also be a signature computed using an asymmetric key, e.g., using ECDSA. In the latter case, a private asymmetric key is derived from the noisy bit string and used to sign the helper data and/or the second voltage indicator. Verifying a token computed with an asymmetric key does not require recomputation of the token, but instead uses verification using the public key corresponding to the private key. Also the public key may be computed from the noisy bit string, e.g., derived from the private key.

The authentication token may be computed by authentication unit 144, e.g., during an enrollment phase. In an embodiment, authentication unit 144 is arranged to compute an authentication token over helper data 240 using the verification key, and store the authentication token in the helper data memory. The authentication token may also be computed by an external computer.

In an embodiment, selector 125 includes a settings register. The settings register is arranged to receive the second voltage indicator, e.g., a digital representation of the second voltage. The authentication token is computed over the helper data and the content of the settings register at the time the noisy bit string is obtained.

In embodiments, the authentication token may be computed over at least the helper data, over at least the second voltage indicator, or over at least the helper data and the second voltage indicator.

Figure 4A:
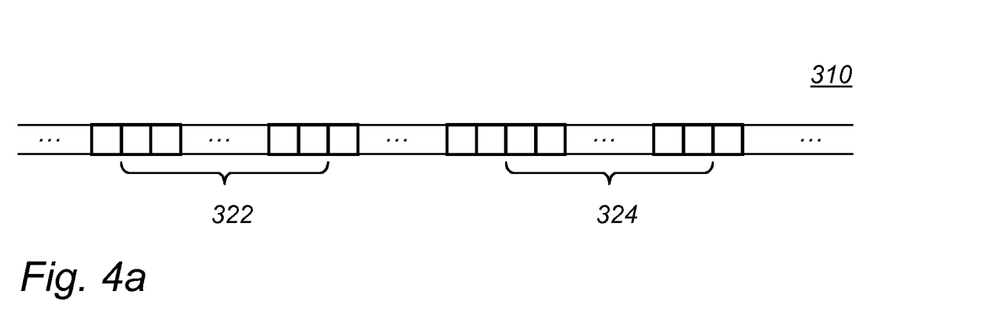

Control unit 130 may be arranged to compute the verification key and operational key from the same range 220, but this is not necessary. FIG. 4a shows a variant in which memory cells 310 contain two ranges: a first range 322, and a second range 324. First range 322 and second range 324 are at least partially different. They may be partially overlapping, but for increased effect they may also be disjoint, e.g., non-overlapping, e.g., as shown in FIG. 4a. In an embodiment, the verification key is derived from a first noisy bit string computed from first range 322, while the operational key is derived from a noisy bit string computed from second range 324.

For example, in an embodiment this may be done as follows:

During an enrollment phase, first range 322 is read out in PUF read-out mode to obtain a first noisy bit string. First helper data is computed for the first noisy bit string and stored in helper data memory 140. A verification key is computed from the first noisy bit string and the first helper data. Using the verification key an authentication token is computed over the first helper data and the second voltage indicator. The authentication token is stored in helper data memory 140. Second range 324 is also read out in PUF read-out mode. The latter PUF read-out mode uses the same second voltage as the PUF read-out of the first range 322. For example, a settings register has the same contents for reading out second range 324 as first range 322. Second helper data is computed for the second noisy bit string and stored in helper data memory 140. Optionally, an operational key may be computed at this point from the second noisy bit string and the second helper data. For example, the operational key may be used to encrypt data, e.g., sensitive, or secret data, e.g., further keys, proprietary computer code, and the like. In an embodiment, the verification key is a symmetric key and the operational key is an asymmetric key. During the enrollment phase, the public part of the asymmetric operational key may be exported from device 101, e.g., to an external computer. For example, the latter may be done in the form of a certificate having the public key, and signed by the private part of the asymmetric operational key.

During an operational phase, first range 322 is read out in PUF read-out mode to obtain the first noisy bit string again. Note that this second version of the first noisy bit string may differ somewhat from the string read during the enrollment phase. First helper data is retrieved for the first noisy bit string from helper data memory 140. A verification key is computed from the first noisy bit string and the first helper data. Using the verification key an authentication token stored in helper data memory 140 is verified over the first helper data and the second voltage indicator. If the authentication token is successfully verified, then second range 324 is also read out in PUF read-out mode. The latter PUF read-out mode uses the same second voltage as the PUF read-out of the first range 322. Second helper data is retrieved for the second noisy bit string from helper data memory 140. The operational key is computed from the second noisy bit string and the second helper data. For example, the operational key may be used to decrypt data. If the operational key is an asymmetric key, then the private part may be used to sign data and/or decrypt data.

Note that also in the above embodiment, the first range 322 and second range 324 may be used to store different data, which may be complete unrelated to the security application. Interestingly, it is this property that makes the embodiment of FIG. 4a attractive. While using a verification key derived separately from the operational key is desirable form a security perspective, it may double the amount of PUF data needed. By reusing non-volatile memory for two different purposes, this problem is effectively sidestepped. In many application, there is more than sufficient non-volatile memory available, e.g., to store application code.

In an embodiment, helper data memory 140 is part of memory 110. For example, the helper data may be stored in memory 110, but in different cells than those of range 220. Interestingly, it is even possible to store at least part of the helper data in the same memory cells used to obtain the noisy bit string. For example, this may be done by using a sequence of ranges. A range of the sequence contains helper data for a previous range, and is used to compute a noisy bit string used with helper stored in the next range. All ranges of the sequence are used both for helper data and for a noisy bit string, except that a first range of the sequence is only used to obtain noisy bit string, and a last range is only used for helper data.

Figure 4B:
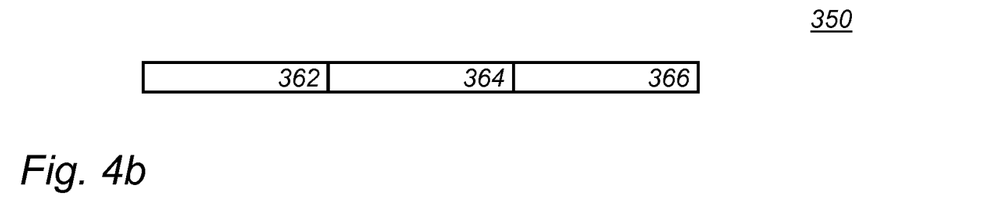

An embodiment is illustrated in FIG. 4b. FIG. 4b shows three ranges of memory cells: first range 362, second range 364 and third range 366. Below a possible embodiment is described:

During enrollment, e.g., authentication unit 144 may be arranged to
  read first range 362 in PUF read-out mode, obtaining a first noisy bit string,
  compute first helper data for first range 362,
  store first helper data in second range 364.
Next,
  read second range 364 in PUF read-out mode, obtaining a second noisy bit string,
  compute second helper data for second range 364,
  store second helper data in third range 366.

This may continue for further ranges, not shown in FIG. 4b.

During an operational phase, first range 362 and second range 364 are read out in PUF read-out mode, and second range 364 and third range 366 in regular read-out mode. At least second range 364 is read out both in regular and puf read-out mode.

Typically, if the helper data is computed for a range that contains unrelated data, then the helper data for that range will be shorter than the range for which it is computed. There are several ways to deal with this. Below we will assume that a logical 0 in a cell corresponds to the state in which a cell can be read out for PUF data in PUF read-out mode; the example may be correspondingly adapted if the logical 1 state corresponds to the state in which a cell can be read out for PUF data in PUF read-out mode.

In an embodiment, all ranges, e.g., ranges 362, 364 and 366 are of equal length. First all 0's are written to the first range of the sequence, e.g., first range 362, e.g., during enrollment. This maximizes the amount of PUF data obtainable from first range 362. The helper data corresponding to a first noisy bit string obtained from range 362 maybe equal in length, and is written to second range 364. A second noisy bit string obtained from second range 364 is approximately half as long as the range 364, since only about half of the cells in range 364 are 0's. Second helper data for second noisy bit string 364 is thus about half as long as range 364 and range 366. The second helper data is written to range 366; the remainder of range 366 may be filled with 0's to optimize it for PUF data, or filled with random data, etc.

In a variant of this embodiment, first range 362 is not filled with 0's but with, possibly unrelated, other data, e.g., application code. In this case, first helper data will be shorter and second range 364 may be padded, e.g., with 0's, etc. In an embodiment, the ranges are not of equal size. Ranges are made smaller to fit the helper data, no or less padding is used. These embodiments assume that the noisy bit string is processed to remove fixed 1's. In an embodiment, this processing is not done. In this case all helper data may be chosen of equal length as the noisy bit strings. This considerably simplifies operation, at the expense of some-what less efficient error correction.

If needed administrative data may be stored, e.g., in memory 110, e.g., store the length of the helper data in the multiple ranges.

During operational use, some of the ranges in the sequence of ranges, e.g., range 364, are read both in regular read-out mode, to obtain the helper data, or part thereof, and to obtain a noisy bit string. Note that the order in which the ranges are read is arbitrary. Moreover, for any range either PUF or regular read out may be done first. For example, in an embodiment, first all ranges are read out in regular read-out, followed by a read-out in PUF read-out. This order has the benefit that the regular read-out can be used, both for processing the noisy bit string, e.g., to remove 1's, and to obtain helper data.

In an embodiment, the second voltage is higher than the first voltage, e.g., using a FLASH or EEPROM memory 110. In this case the programmed state, e.g., with a charged floating gate, is the PUF state, i.e., the state from which PUF data may be obtained. Device 101 may include, e.g., a PUF reconfiguration unit (not separately shown), is arranged to erase and re-program a programmed memory cell. This has the effect that the PUF data is destroyed and replaced by new random data. For example, the memory may be read-out in regular read-out and copied to a working memory. Next the memory is erased, e.g., by writing all 1's (not-programmed) states to the memory. Finally, the memory is reprogrammed form the working memory. Note that the original data for regular read-out is thus unaffected. This effect is illustrated in FIG. 2. After the reprogramming, a PUF read-out may be as shown in strings 268 and 269. In string 268 only the PUF cells are shown in the PUF read out, e.g., those with a 0 in regular read-out. In string 269 the string as read-out is shown. That a PUF cannot be reconfigured is a limitation of many conventional types of PUFs. It means that if the PUF has been compromised in some way, e.g., its content leaked or a key derived there from the device cannot be brought back in the secure state. The PUF reconfiguration unit may also be used in case a tamper sensor is included in device 101, e.g., a light sensor, detects tampering with device 101. In the latter case, the PUF reconfiguration is used to destroy the PUF data, hopefully, before an attacker can somehow gain access.

The PUF as described herein may be applied in a wide range of practical applications. As a further example, the PUF may be used for device authentication, etc. Device authentication may, for example, be done as follows. During an enrollment phase, a cryptographic device, such as cryptographic device 100, computes a noisy bit string from the PUF, and derives helper data and a cryptographic key therefrom, e.g., a symmetric key. The helper data and symmetric key is transmitted to a server. For example, the transmission may be done in a secure location, such as a manufacturing location. Neither helper data nor key need to be stored at the device. Later when the device needs to be authenticated the helper data and a challenge is transmitted to the cryptographic device. The cryptographic device uses the helper data to correct the noisy bit string and obtain the cryptographic key again. The recreated key is used to compute a message authentication code keyed with the key over the challenge. The resulting MAC is returned to the server, and verified there. A correct MAC proves that the device had access to the same PUF as was present at the secure location, and thus authenticates the device. For example, this may be used to detect counterfeits. The protocol may be extended with additional elements, e.g. identification numbers, such as a serial number or the like.

In an embodiment, device 101 includes a voltage unit 150 for determining the second voltage. A voltage unit 150 may not be necessary, instead a fixed second voltage may be used, or the second voltage may be determined by an external voltage unit. After determining the second voltage, the second voltage may be stored; in this case all or part of second voltage unit 150 may be discarded, e.g., by erasing the corresponding code.

Voltage unit 150 is arranged to
  perform multiple read-outs of the memory in PUF read-out mode using different second voltages, and determine a number of 1 or 0 bits in the noisy bit string for different second voltages, For example, the multiple second voltages may be selected from a look up table. For example, different second voltages may be obtained by writing a different second voltage indicator into a settings register. The second voltage of the different second voltages for which the number of 1 bits in the corresponding noisy bit string is closest to a selection criterion is taken as the final second voltage. For example, the selection criterion may be that the second number of 1 bits is closest to 50%. The voltage unit may use as a binary search to find the second voltage.

The final second voltage which is to be used for reading the noisy bit string from which, e.g., an operational key is derived, may be stored on device 101, e.g., in a memory, e.g., in helper data memory 140. Instead voltage unit 150 may be used each time that the second voltage is required, and computed anew. The latter has the benefit that the second voltage does not need to be stored, which in turn implies that an attacker cannot attempt to modify the memory in which the second voltage indicator is stored. Having a higher error rate can at least partially be offset by increasing the amount of PUF data and selecting an error correcting code which can correct a larger number of errors—typically at the expense of a lower rate.

Typically, the devices 100 and 101 each include a microprocessor (not separately shown) which executes appropriate software stored at the devices 100 and 101; for example, that software may have been downloaded and/or stored in a corresponding memory, e.g., a volatile memory such as RAM or a non-volatile memory such as Flash (not separately shown). The software may be stored in memory 110. Alternatively, the devices 100 and 101 may, in whole or in part, be implemented in programmable logic, e.g., as field-programmable gate array (FPGA). Devices 100 and 101 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, devices 100 or 101 include one or more of a memory read-out circuit, a selector circuit, a control circuit, a validation circuit, an authentication circuit, a voltage circuit. The circuits implement the corresponding units described herein. The circuits may be a processor circuit and storage circuit, the processor circuit executing instructions represented electronically in the storage circuits. The circuits may also be FPGA, ASIC or the like. In an embodiment, units 130, and optionally one or more of units 142, 144, and 150 are implemented in software.

Figure 5:
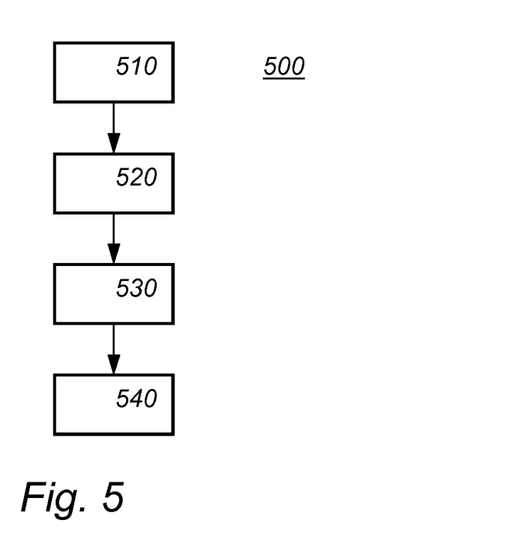

FIG. 5 schematically shows an example of an embodiment of a cryptographic method 500. Method 500 includes
  sending 510 a selector signal configuring a memory read-out unit for regular read-out mode of a non-volatile memory, the memory being non-volatile and including multiple memory cells 210 that are programmed or not-programmed, a range 220 of the memory storing data. For example, sending the signal may be done by writing in a settings register, or otherwise configuring the memory.
  in the regular read-out mode, reading 520 the memory range to obtain the data, by applying a first voltage to selected memory cells to determine if the cells are programmed or not-programmed,
  sending 530 a selector signal configuring the memory read-out unit for PUF read-out mode of the non-volatile memory, and
  in the PUF read-out mode, obtaining 540 a noisy bit string from the memory range, by applying a second voltage to selected programmed memory cells. The obtaining of the noisy bit string may use the same mechanism as the reading of the memory cell, but at a different reference voltage.

Many different ways of executing the method are possible, as will be apparent to a person of ordinary in the art. For example, the order of the steps can be varied or some steps may be executed in parallel. For example, regular and PUF reading maybe done in any order. Moreover, in between steps other method steps may be inserted. The inserted steps may represent refinements of the method such as described herein, or may be unrelated to the method.

A method according to the disclosed embodiments may be executed using software, which includes instructions for causing a processor system to perform method 500. Software may include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the disclosed embodiments may be executed using a bitstream arranged to configure programmable logic, e.g., a field-programmable gate array (FPGA), to perform the method.

It will be appreciated that the disclosed embodiments also extend to computer programs, particularly computer programs on or in a carrier, adapted for putting the disclosed embodiments into practice. The program may be in the form of source code, object code, a code intermediate source, and object code such as partially compiled form, or in any other form suitable for use in the implementation of the method according to the disclosed embodiments. An embodiment relating to a computer program product includes computer executable instructions corresponding to each of the processing steps of at least one of the methods set forth. These instructions may be subdivided into subroutines and/or be stored in one or more files that may be linked statically or dynamically. Another embodiment relating to a computer program product includes computer executable instructions corresponding to each of the at least one of the systems and/or products set forth.

Figure 6A:
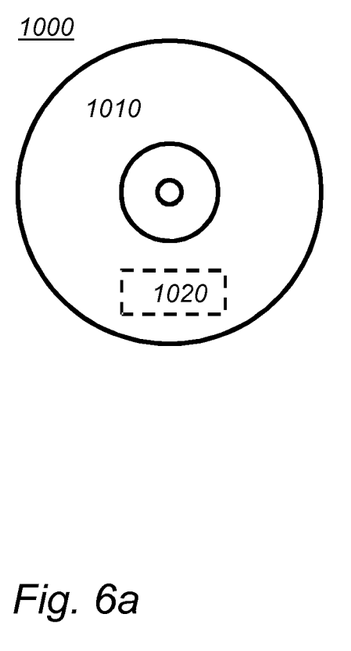

FIG. 6a shows a computer readable medium 1000 having a writable part 1010 including a computer program 1020, the computer program 1020 including instructions for causing a processor system to perform a method of obtaining a noisy string, according to an embodiment. The computer program 1020 may be embodied on the computer readable medium 1000 as physical marks or through magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 includes instructions for causing a processor system to perform said method of obtaining a noisy string.

Figure 6B:
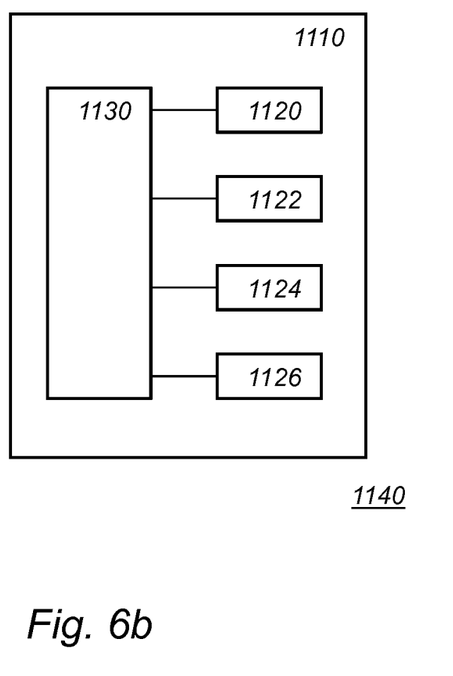

FIG. 6b shows in a schematic representation of a processor system 1140 according to an embodiment. The processor system includes one or more integrated circuits 1110. The architecture of the one or more integrated circuits 1110 is schematically shown in FIG. 6b. Circuit 1110 includes a processing unit 1120, e.g., a CPU, for running computer program components to execute a method according to an embodiment and/or implement its modules or units. Circuit 1110 includes a memory 1122 for storing programming code, data, etc. Part of memory 1122 may be read-only. Circuit 1110 may include a communication element 1126, e.g., an antenna, connectors or both, and the like. Circuit 1110 may include a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the disclosure, and that those of ordinary skill in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The disclosed embodiments may be implemented by hardware having several distinct elements, and by a suitably programmed computer. In the device claim enumerating several components, several of these components may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A cryptographic device, comprising:
a non-volatile memory, the non-volatile memory including multiple memory cells that are programmed or not-programmed, a range of the memory storing data,
a memory read-out unit configured to operate in a regular read-out mode and a PUF read-out mode, the memory read-out unit including:
a selector arranged to receive a selector signal, wherein based on the received selector signal, the selector is arranged to configure the memory read-out unit to switch from the regular read-out mode to the PUF read-out mode for reading the same memory, or to switch from the PUF read-out mode to the regular read-out mode for reading the same memory,
in the regular read-out mode, the memory read-out unit being arranged to apply a first voltage to selected memory cells to determine if the cells are programmed or not-programmed, and
in the PUF read-out mode, the memory read-out unit being arranged to apply a second voltage to selected programmed memory cells to read a noisy bit string from the memory,
a non-volatile helper data memory arranged to store helper data including redundancy information for the noisy bit string,
a controller arranged to before an enrollment phase, write read-only data to the memory range,
in the enrollment phase, send the selector signal to the selector configuring the memory read-out unit for the PUF read-out mode; obtain the noisy bit string from the memory range; compute the helper data; and store the helper data in the helper data memory for error correction in a use phase after the enrollment phase,
in the use phase, send the selector signal to the selector configuring the memory read-out unit in the regular read-out mode, and reading the memory range to obtain the read-only data, and
in the use phase, send the selector signal to the selector configuring the memory read-out unit for the PUF read-out mode, obtain a noisy bit string from the memory range, and correct the noisy bit string using the helper data in the helper data memory.

2. The cryptographic device as in claim 1, wherein the controller is arranged to execute or render the data obtained from the memory range in regular read-out mode.

3. The cryptographic device as in claim 2, wherein the controller is arranged to determine a device identifier or cryptographic key from at least part of the noisy bit string read from the memory range in PUF read-out mode.

4. The cryptographic device as in claim 2, wherein the memory includes a first memory range and a second memory range, the controller being arranged to: read the first memory range in PUF read-out mode, obtaining a first noisy bit string, read the second memory range in PUF read-out mode, obtaining a second noisy bit string, and read the second memory range in regular read-out mode, obtaining at least a part of helper data for the second noisy bit string.

5. The cryptographic device as in claim 1, wherein the controller is arranged to determine a device identifier or cryptographic key from at least part of the noisy bit string read from the memory range in PUF read-out mode.

6. The cryptographic device as in claim 5, wherein the memory includes a first memory range and a second memory range, the controller being arranged to: read the first memory range in PUF read-out mode, obtaining a first noisy bit string, read the second memory range in PUF read-out mode, obtaining a second noisy bit string, and read the second memory range in regular read-out mode, obtaining at least a part of helper data for the second noisy bit string.

7. The cryptographic device as in claim 1, wherein:
the controller is arranged to determine a cryptographic verification key from at least part of the corrected noisy bit string,
the non-volatile helper data memory is arranged to store an authentication token previously computed over the helper data and/or a second voltage indicator indicating the second voltage applied by the memory read-out unit using the verification key, and
the validation unit is arranged to verify the authentication token using the verification key.

8. The cryptographic device as in claim 7, wherein the controller is arranged to:
if the validation unit successfully verifies the authentication token, determine a further cryptographic key from at least part of a noisy bit string read from a further range of the memory in PUF read-out mode.

9. The cryptographic device as in claim 1, wherein the memory includes a first memory range and a second memory range, the controller being arranged to:

read the first memory range in PUF read-out mode, obtaining a first noisy bit string,
read the second memory range in PUF read-out mode, obtaining a second noisy bit string, and
read the second memory range in regular read-out mode, obtaining at least a part of helper data for the second noisy bit string.

10. The cryptographic device as in claim 1, wherein the second voltage is higher than the first voltage, and wherein the device is arranged to erase and re-program a programmed memory cell.

11. The cryptographic device as in as in claim 1, wherein:
the cryptographic device is arranged to receive the second voltage indicator from external of the cryptographic device, or
the cryptographic device includes a non-volatile memory arranged to store the second voltage indicator.

12. The cryptographic device as in claim 1 comprising a voltage unit, the voltage unit being arranged to:
perform multiple read-outs of a range of the memory in PUF read-out mode using different second voltages,
determine a number of 1 or 0 bits in the noisy bit string for different second voltages, and
select a second voltage of the different second voltages for which the number of 1 bits in the corresponding noisy bit string is closest to a selection criterion.

13. The cryptographic device as in claim 1, wherein:
the memory cells are flash memory cells, EEPROM memory cells, ROM memory cells, and/or PCM memory cells.

14. The cryptographic device as in claim 1, wherein a first voltage applied to a not-programmed memory cell causes a current detectable by the read-out unit, the first voltage applied to a programmed memory cell not causing the current detectable by the read-out unit.

15. A method of obtaining a noisy string, comprising:
before an enrollment phase, writing read-only data to a memory range of a non-volatile memory, the memory comprising multiple memory cells that are programmed or not-programmed,
sending a selector signal configuring a memory read-out unit configured to switch from a regular read-out mode of the non-volatile memory to a PUF read-out mode of the non-volatile memory or to switch from the PUF read-out mode to the regular read-out mode,
in the enrollment phase: sending the selector signal configuring the memory read-out unit for the PUF read-out mode, obtaining the noisy bit string from the memory range, computing helper data including redundancy information for the noisy bit string, and storing the helper data for error correction in a use phase after the enrollment phase,
in the use phase: sending the selector signal configuring the memory read-out unit in the regular read-out model, and, in the regular read-out mode, applying a first voltage to selected memory cells to determine if the cells are programmed or not-programmed, thus reading the memory range to obtain the read-only data,
in the use phase: sending the selector signal configuring the memory read-out unit for the PUF read-out mode of the non-volatile memory, and, in the PUF read-out mode, applying a second voltage to selected programmed memory cells thus reading a noisy bit string from the memory range, and correcting the noisy bit string using the stored helper data.

16. A computer program product comprising:
a non-transitory computer readable medium;
a computer program comprising computer program instructions wherein, when the computer program is run on a computer, the computer program is arranged to perform a method of obtaining a noisy string, comprising:
before an enrollment phase, writing read-only data to a memory range of a non-volatile memory, the memory comprising multiple memory cells that are programmed or not-programmed,
sending a selector signal configuring a memory read-out unit configured to switch from a regular read-out mode of the non-volatile memory to a PUF read-out mode of the non-volatile memory or to switch from the PUF read-out mode to the regular read-out mode,
in the enrollment phase: sending the selector signal configuring the memory read-out unit for the PUF read-out mode, obtaining the noisy bit string from the memory range, computing helper data including redundancy information for the noisy bit string, and storing the helper data for error correction in a use phase after the enrollment phase,
in the use phase: sending the selector signal configuring the memory read-out unit in the regular read-out model, and, in the regular read-out mode, applying a first voltage to selected memory cells to determine if the cells are programmed or not-programmed, thus reading the memory range to obtain the read-only data,
in the use phase: sending the selector signal configuring the memory read-out unit for the PUF read-out mode of the non-volatile memory, and, in the PUF read-out mode, applying a second voltage to selected programmed memory cells thus reading a noisy bit string from the memory range, and correcting the noisy bit string using the stored helper data.

17. The computer program as in claim 16 embodied on the non-transitory computer readable medium.

* * * * *